US008234874B2

(12) United States Patent
Upadhyay et al.

(10) Patent No.: US 8,234,874 B2
(45) Date of Patent: Aug. 7, 2012

(54) SYSTEMS AND METHODS FOR BYPASSING AN INLET AIR TREATMENT FILTER

(75) Inventors: Siddharth Upadhyay, Gujarat (IN); Rahul J. Chillar, Marietta, GA (US)

(73) Assignee: General Electric Company, Schenectady, NY (US)

( * ) Notice: Subject to any disclaimer, the term of this patent is extended or adjusted under 35 U.S.C. 154(b) by 364 days.

(21) Appl. No.: 12/576,566

(22) Filed: Oct. 9, 2009

(65) Prior Publication Data

US 2011/0083419 A1 Apr. 14, 2011

(51) Int. Cl.
*F02C 1/00* (2006.01)

(52) U.S. Cl. .................. 60/772; 60/39.092; 55/314

(58) Field of Classification Search ......... 60/39.092, 60/772, 264; 55/309–310, 312–314, 428–430, 55/432, 466; 415/121.2
See application file for complete search history.

(56) References Cited

U.S. PATENT DOCUMENTS

| | | | | |
|---|---|---|---|---|
| 2,407,194 A | * | 9/1946 | Vokes | 55/302 |
| 3,756,416 A | * | 9/1973 | Wood | 210/408 |
| 4,312,645 A | | 1/1982 | Mavros et al. | |
| 4,416,111 A | | 11/1983 | Lenahan et al. | |
| 4,698,078 A | * | 10/1987 | Mavros | 96/402 |
| 4,972,672 A | * | 11/1990 | Sanderson et al. | 60/39.092 |
| 5,002,121 A | | 3/1991 | von Erichsen | |
| 5,057,129 A | | 10/1991 | Kierzkowski et al. | |
| 5,064,453 A | * | 11/1991 | Jacquish | 96/112 |
| 5,090,194 A | * | 2/1992 | Richards et al. | 60/794 |
| 5,279,358 A | | 1/1994 | Hannis | |
| 5,297,173 A | | 3/1994 | Hikmet et al. | |
| 6,123,751 A | | 9/2000 | Nelson et al. | |
| 6,875,256 B2 | | 4/2005 | Gillingham et al. | |
| 7,007,484 B2 | | 3/2006 | Stegmaier et al. | |
| 7,297,173 B2 | | 11/2007 | Renwart et al. | |
| 7,966,802 B2 | * | 6/2011 | Szepek et al. | 60/39.281 |
| 2007/0294984 A1 | * | 12/2007 | Chillar et al. | 55/314 |

FOREIGN PATENT DOCUMENTS

GB 2445077 A 6/2008
JP 2004124764 A 4/2004

OTHER PUBLICATIONS

GB 1016805.2, Search Report and Written Opinion, Jan. 12, 2011.

* cited by examiner

*Primary Examiner* — Phutthiwat Wongwian
(74) *Attorney, Agent, or Firm* — Armstrong Teasdale LLP

(57) ABSTRACT

A method of assembling an inlet air filter assembly for use with a turbine engine system. The method includes coupling an inlet hood to an air filter enclosure, such that an airflow path is defined between the inlet hood and the air filter enclosure. A pre-filter is coupled to the inlet hood, such that the pre-filter is positioned within the airflow path. A filter bypass assembly is coupled to the pre-filter for moving the pre-filter from an operating position to a bypass position during operation of the turbine engine system.

20 Claims, 5 Drawing Sheets ered SYSTEMS AND METHODS FOR BYPASSING AN INLET AIR TREATMENT FILTER

BACKGROUND OF THE INVENTION

The present invention relates generally to inlet air treatment systems, and more specifically to systems and methods for bypassing inlet air pre-filter systems for gas turbine engines.

At least some gas turbine engines include a compressor section, a combustor section, and at least one turbine section. The compressor compresses air, which is mixed with fuel and channeled to the combustor. The compressor compresses air, that is mixed with fuel and channeled to the combustor. The mixture is then ignited generating hot combustion gases that are then channeled to the turbine. The turbine extracts energy from the combustion gases for powering the compressor, as well as producing useful work to power a load, such as an electrical generator, or to propel an aircraft in flight.

At least some known gas turbine engine systems include inlet air treatment systems that remove moisture and/or dust from air channeled to the compressor. At least some known inlet air filtration systems include pre-filters that remove moisture from intake air, and final filters that remove dust and debris from intake air. During normal operating conditions, it is desired to have the inlet air treatment system channel filtered air to the compressor with minimal air disruption and pressure drop through the inlet air treatment system. However, at least some known pre-filters cause a pressure drop of about 0.5" of water column under normal operating conditions. Over time, the pressure drop across the pre-filters and filter may increase which may result in reducing an amount of air flow to the compressor and reducing the operating efficiency of the gas turbine engine. In some instances, the reduced air flow may cause a compressor surge that may damage the compressor. To prevent compressor surges, in at least some known inlet air treatment systems, pre-filters have to be removed manually to be cleaned. This removal process may require shutdown of the gas turbine engine for a period of 3 to 4 days.

Accordingly, it is desirable to provide a method and/or system for bypassing the pre-filter during periods when the pressure drop through the inlet air treatment system is high enough to reduce compressor operating efficiency and/or to result in a reduced air flow that may cause a compressor surge. Moreover, it is desirable to provide a system that does not require the pre-filters be manually removed from service during operation of the turbine engine.

BRIEF DESCRIPTION OF THE INVENTION

In one embodiment, a method of assembling an inlet air filter assembly for use with a turbine engine system is provided. The method includes coupling an inlet hood to an air filter enclosure, such that an airflow path is defined between the inlet hood and the air filter enclosure. A pre-filter is coupled to the inlet hood, such that the pre-filter is positioned within the airflow path. A filter bypass assembly is coupled to the pre-filter for moving the pre-filter from an operating position to a bypass position during operation of the turbine engine system.

In another embodiment, an inlet air filter assembly for use in a gas turbine engine system is provided. The inlet air filter assembly includes an inlet hood coupled in flow communication with an air filter enclosure. The inlet hood includes a pre-filter and a filter bypass assembly coupled to the pre-filter for moving the pre-filter between an operating position and a bypass position during operation of the gas turbine engine.

In yet another embodiment, a gas turbine engine system is provided. The gas turbine engine system includes a compressor, a combustor, and an inlet air filter assembly. The combustor is in flow communication with the compressor to receive at least some of the air discharged by the compressor. The inlet air filter assembly is coupled in flow communication with the compressor. The inlet air filter assembly includes a filter bypass assembly coupled to a pre-filter positioned within an inlet hood. The filter bypass assembly is configured to move the pre-filter between an operating position and a bypass position during operation of the gas turbine engine system.

DETAILED DESCRIPTION OF THE INVENTION

The exemplary methods and systems described herein overcome the disadvantages of known inlet air treatment systems by providing a pre-filter bypass assembly that enables an inlet air pre-filter to be removed from operation without requiring a shutdown of the associated turbine engine. More specifically, the embodiments described herein facilitate bypassing a pre-filter during operating periods when the pressure drop through the inlet air treatment system is high enough to reduce compressor operating efficiency and/or to result in a compressor surge that may damage the compressor. In addition, the embodiments described herein facilitate automatically bypassing the intake air pre-filter without requiring a human operator to remove the pre-filter from service.

Figure 1:
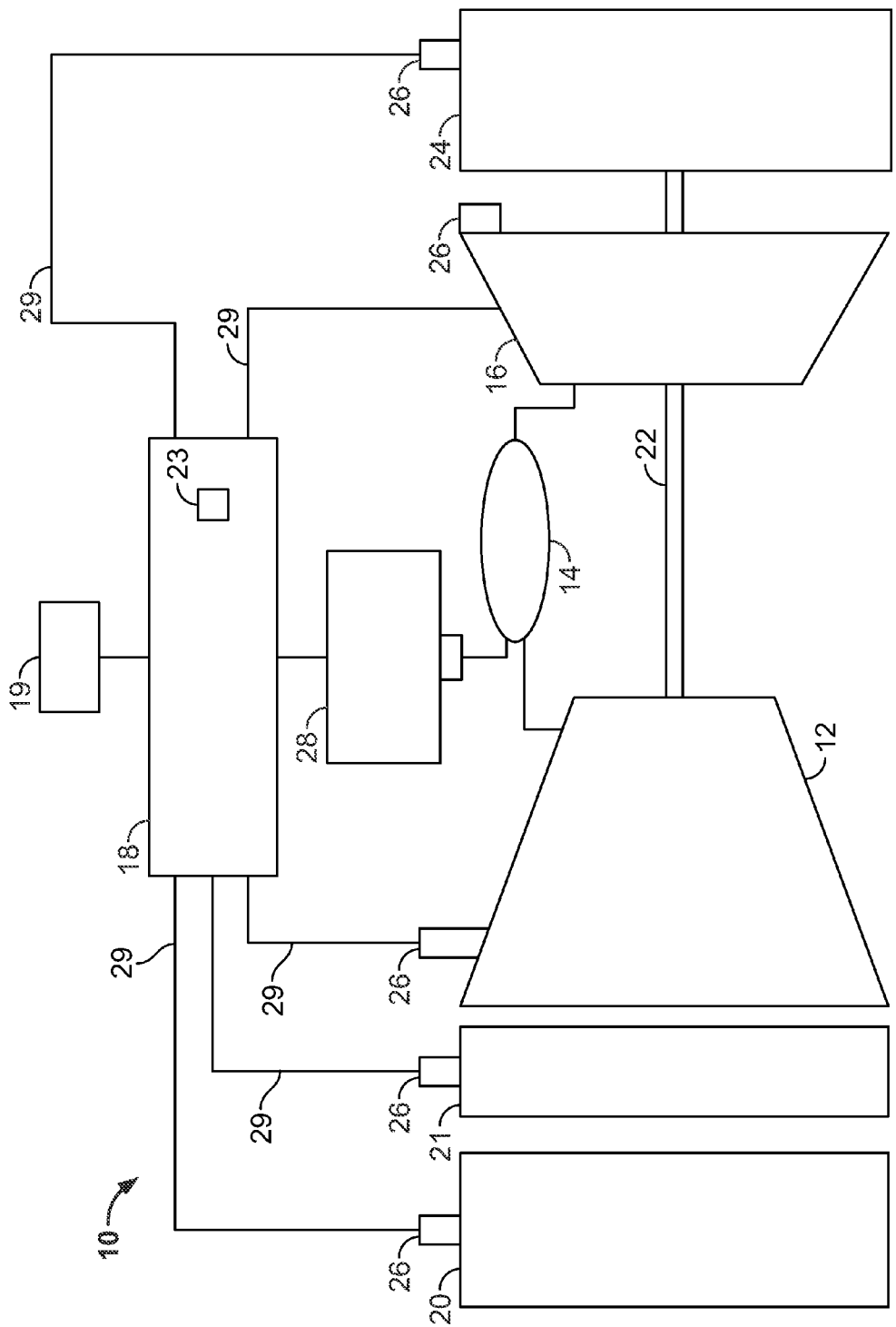
FIG. 1 is a schematic illustration of an exemplary gas turbine engine system.

FIG. 1 is a schematic diagram of a gas turbine engine system 10. In the exemplary embodiment, gas turbine engine system 10 includes an inlet air treatment system 20, a compressor 12, a combustor 14, a turbine 16 rotatably coupled to compressor 12 via a rotor shaft 22, a control system or controller 18, and a fuel control assembly 28. Combustor 14 is coupled to compressor 12 such that combustor 14 is in flow communication with compressor 12. Fuel control assembly 28 is coupled to combustor 14 and channels fuel into combustor 14. Inlet air treatment system 20 channels filtered air to compressor 12. In one embodiment, injected water and/or other humidifying agents are also channeled to compressor 12 through inlet air treatment system 20. Inlet air treatment system 20 may include multiple ducts, filters, screens and/or sound-absorbing devices that contribute to pressure losses of ambient air flowing through inlet air treatment system 20 into one or more inlet guide vanes 21 of compressor 12.

During operation, inlet air treatment system 20 channels filtered ambient air towards compressor 12 to be compressed to a higher pressure. Compressor 12 discharges compressed air towards combustor 14 wherein it is mixed with fuel and ignited to generate combustion gases that flow to turbine 16. Rotation of turbine 16 drives compressor 12. Turbine 16 converts gas stream thermal energy from the combustion gases to mechanical rotational energy. In the exemplary embodiment, gas turbine engine system 10 may be used to drive a load 24, such as a generator, which may be coupled to rotor shaft 22.

The operation of gas turbine engine system 10 may be monitored by several sensors 26 that detect various conditions of turbine 16, generator 24, and/or ambient environment. For example, pressure sensors 26 may monitor ambient pressure and/or static and dynamic pressure levels at inlet air treatment system 20 and/or at any other location in a gas stream defined within gas turbine engine system 10. Specifically, in the exemplary embodiment, temperature sensors 26 measure ambient air temperature at the inlet air treatment system 20, and other sensors 26 may include flow sensors, speed sensors, flame detector sensors, valve position sensors, guide vane angle sensors, and/or other sensors that sense various parameters relative to the operation of gas turbine engine system 10. As used herein, the term "parameters" refers to physical properties whose values can be used to define the operating conditions of gas turbine engine system 10, such as temperatures, pressures, and gas flows at defined locations.

In the exemplary embodiment, control system 18 communicates with sensors 26 via communication links 29 that may be implemented in hardware and/or software. In one embodiment, communication links 29 remotely communicate data signals to and from control system 18 in accordance with any wired or wireless communication protocol known to one of ordinary skill in the art guided by the teachings herein. Such data signals may include signals indicative of operating conditions of sensors 26 transmitted to the control system 18 and various command signals communicated by control system 18 to sensors 26.

Control system 18 may be a computer system that includes a display 19 and at least one processor 23. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or control system can also include memory, input channels, and/or output channels. Control system 18 executes programs to control the operation of gas turbine engine system 10 based on sensor inputs and instructions from human operators. Programs executed by control system 18 may include, for example, calibrating algorithms for calibrating gas sensors 26. User input functionality is provided in display 19, which acts as a user input selection device. In the exemplary embodiment, display 19 is responsive to the user pressing contact on display 19 to selectively perform functionality. Display 19 may also include a keypad which operates in a conventional well known manner. Thus, the user can input desired operational functions available with control system 18 by contacting a surface of display 19. Commands generated by control system 18 cause gas sensors 26 to monitor the ambient environment for the presence of combustible zones, toxic zones, and/or oxygen deficient zones, and to activate other control settings on gas turbine engine system 10.

In the embodiments described herein, memory may include, without limitation, a computer-readable medium, such as a random access memory (RAM), and a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface. Further, in the exemplary embodiment, output channels may include, without limitation, a control device, an operator interface monitor and/or a display.

Figure 2:
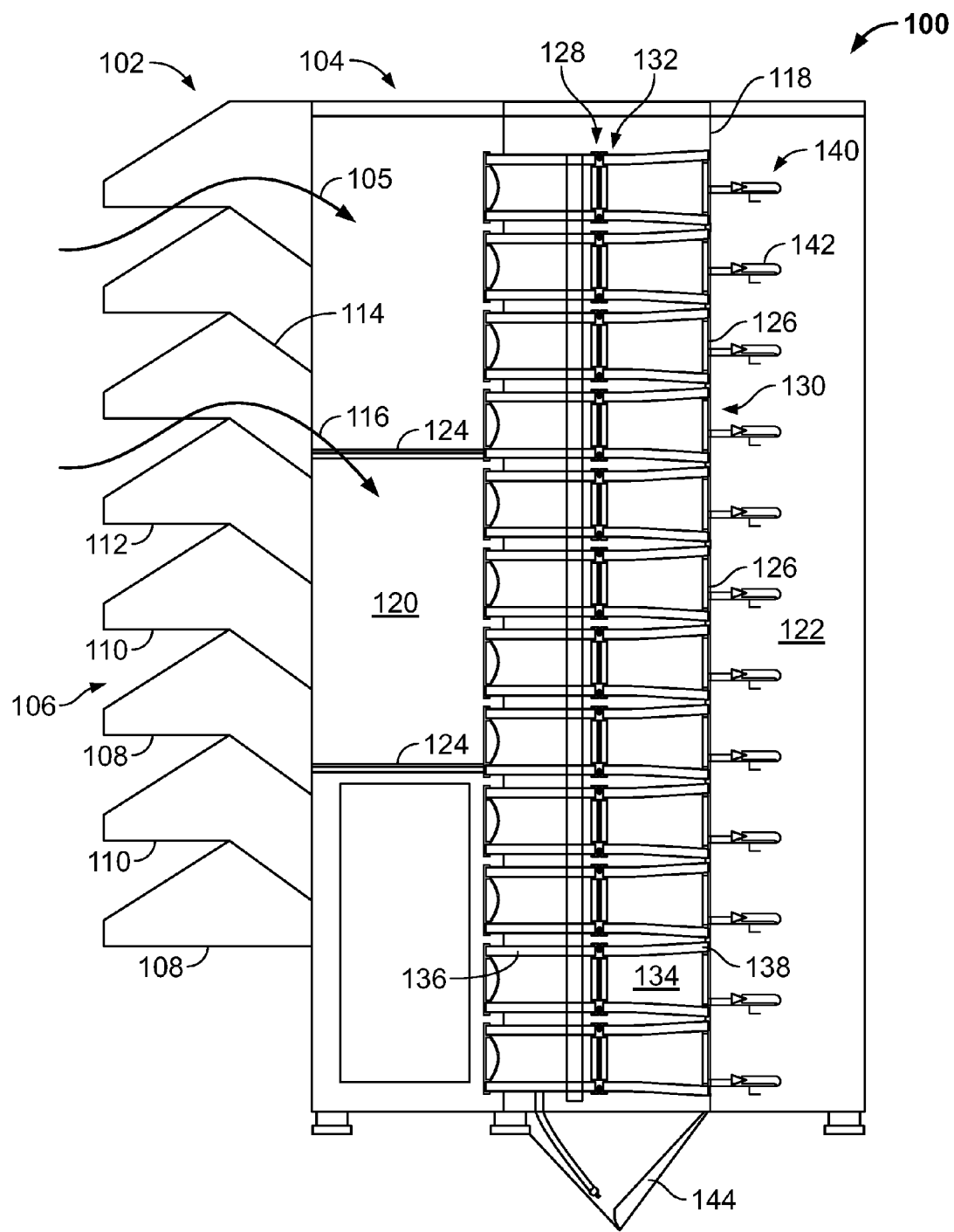
FIG. 2 is a schematic view of an exemplary inlet air treatment system that may be used with the turbine engine shown in FIG. 1.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, flow control system control commands. The execution of sequences of instructions is not limited to any specific combination of hardware circuitry and software instructions FIG. 2 is a schematic view of an exemplary inlet air treatment system 100 that may be used with gas turbine engine system 10 (shown in FIG. 1). Inlet air treatment system 100 includes an inlet hood assembly 102 that is coupled in flow communication with an air filter enclosure 104 such that an airflow path 105 is defined between inlet hood assembly 102 and air filter enclosure 104. Inlet hood assembly 102 includes a plurality of vertically-spaced inlet hoods 106. In the exemplary embodiment, each inlet hood 106 includes an air inlet opening 108, a pre-filter 110, a filter bypass assembly 112, and a deflector plate 114. Each pre-filter 110 is positioned within inlet opening 108 to facilitate filtering air flow 116 channeled through inlet opening 108 into air filter enclosure 104. As air flow 116 is channeled through inlet hood 106, deflector plate 114 directs air flow 116 downwardly into air filter enclosure 104.

Air filter enclosure 104 includes a filter wall 118 that is positioned within air filter enclosure 104 such that an air filter chamber 120 and a clean air chamber 122 are defined therein. In the exemplary embodiment, a plurality of access walkways 124 extend between filter wall 118 and air filter enclosure 104 to provide access to each inlet hood 106. A plurality of apertures 126 extend through filter wall 118 to couple air filter chamber 120 in flow communication with clean air chamber 122. A filter assembly 128 positioned within air filter chamber 120 is coupled to filter wall 118 such that filter assembly 128 is in flow communication with apertures 126. Filter assembly 128 includes a plurality of filter cartridges 130 that are each coupled to filter wall 118 such that each filter cartridge 130 extends circumferentially about a corresponding aperture 126. In the exemplary embodiment, filter cartridge 130 includes a tubular-shaped filter membrane 132 that includes a filtered air channel 134 defined therein. Moreover, in the exemplary embodiment, filter membrane 132 includes a conical portion 136 that extends from a cylindrical portion 138 such that filtered air channel 134 extends between conical portion 136 and cylindrical portion 138. Each filter cartridge 130 is coupled to filter wall 118 such that filtered air channel 134 is in flow communication with clean air chamber 122 through apertures 126.

A compressed air pulse assembly 140 within clean air chamber 122 is coupled to filter wall 118. Compressed air pulse assembly 140 includes a plurality of pulse jet air cleaners 142 that are each coupled in flow communication with filtered air channel 134 through apertures 126. During cleaning of filter cartridge 130, pulse jet air cleaner 142 pulses a flow of air through filtered air channel 134 to facilitate removing dust and debris from filter membrane 132. A debris collection hopper 144 coupled in flow communication with air filter chamber 120 collects debris entering air filter chamber 120 from inlet hood assembly 102.

During operation of air filter enclosure 104, inlet hood assembly 102 channels air through airflow path 105 into air filter chamber 120. As air flow 116 enters inlet hood assembly 102, pre-filter 110 facilitates removing moisture from air flow 116. Air flow 116 passing through pre-filter 110 impinges against deflector plate 114 and is directed downwardly towards debris collection hopper 144. More specifically, as air flow 116 contacts deflector plate 114, debris carried by air flow 116 is channeled into debris collection hopper 144 by gravity. Air flow 116 channeled through filter membrane 132 is directed into filtered air channel 134. Filter membrane 132 facilitates removing dust and debris carried by air flow 116 such that air entering filtered air channel 134 is substantially free of dust and debris. Air flow 116 is then channeled through apertures 126 and into clean air chamber 122 prior to being channeled downstream to compressor 12 (shown in FIG. 1).

Figure 3:
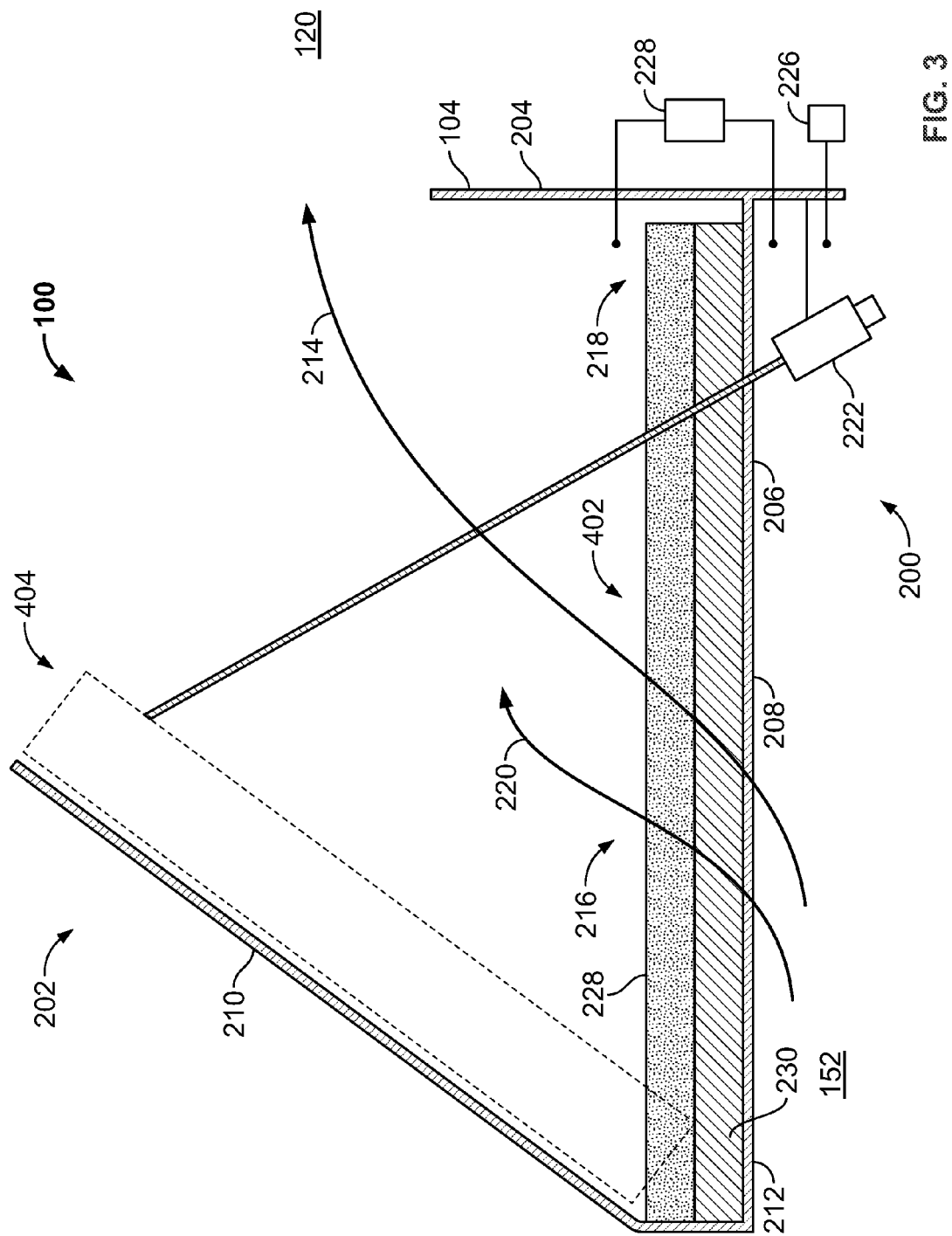
FIG. 3 is a schematic view of an exemplary filter bypass assembly that may be used with the inlet air treatment system shown in FIG. 2.

FIG. 3 is a schematic view of an exemplary filter bypass assembly 200 that may be used with the inlet air treatment system 100. Identical components illustrated in FIG. 3 are labeled with the same reference numbers used in FIG. 2. In the exemplary embodiment, inlet air treatment system 100 includes a plurality of inlet hoods 202 coupled to an outer wall 204 of air filter enclosure 104 such that air filter chamber 120 is in flow communication with ambient air 152. Each inlet hood 202 includes a base member 206 that extends substantially horizontally outward from outer wall 204 to define an inlet 208. An upper hood member 210 is coupled to base member 206 and extends obliquely from an outer portion 212 of base member 206 towards air filter enclosure 104, such that airflow path 214 is defined therein. A plurality of pre-filters 216 are coupled to each base member 206, such that pre-filter 216 substantially covers inlet 208. A support rack 218 is coupled to pre-filter 216, such that pre-filter 216 is movable between a first, or operating, position 402 and a second, or bypass, position 404. In position 402, pre-filter 216 substantially covers inlet 208, such that an airflow 220 entering inlet hood assembly 102 passes through pre-filter 216. In contrast, in bypass position 404, pre-filter 216 only partially covers inlet 208, such that airflow 220 may enter inlet hood 106 without flowing through at least a portion of pre-filter 216. A plurality of filter bypass assemblies 200 are coupled to each inlet hood 106 and pre-filter 216 for moving pre-filter 216 between operating position 402 and bypass position 404.

In the exemplary embodiment, filter bypass assembly 200 includes a hydraulic actuator 222, a differential pressure sensor 224, and a temperature sensor 226. Hydraulic actuator 222 is coupled to pre-filter 216 for controlling positioning of pre-filter 216 between operating position 402 and bypass position 404 (shown in phantom in FIG. 3). In the embodiment, hydraulic actuator 222 moves pre-filter to bypass position 404 by positioning pre-filter 216 closer to upper hood member 210. In an alternative embodiment, hydraulic actuator 222 moves pre-filter 216 to bypass position 404 by positioning pre-filter 216 in any relative position that enables airflow 220 to enter inlet hood 106 without flowing through at least a portion of pre-filter 216.

Differential pressure sensor 224 is coupled to pre-filter 216 for sensing a pressure drop in air flow across pre-filter 216. Temperature sensor 226 is coupled to pre-filter 216 for sensing a temperature of ambient air 152. In the exemplary embodiment, pre-filter 216 also includes a coalescing pad 228 for coalescing moister entrained in air and a moisture separator 230 for removing moister from air flowing across pre-filter 216. Control system 18 is coupled to differential pressure sensor 224, to temperature sensor 226, and to hydraulic actuator 222 for operating hydraulic actuator 222 after receiving a signal from differential pressure sensor 224 and/or temperature sensor 226. Control system 18 may be coupled directly in operational control communication with each hydraulic actuator 222, and/or may be coupled in operational control communication with hydraulic actuator 222 via a communication hub and/or any other suitable communication device(s).

During operation of inlet air treatment system 100, airflow 220 enters inlet hood 202 through inlet 208 and is channeled through pre-filter 216 towards air filter chamber 120. As airflow 220 flows through pre-filter 216, coalescing pad 228 causes moisture contained in airflow to coalesce into larger droplets which are gravity fed into moisture separator 230 and are channeled from airflow 220. In the exemplary embodiment, during operation of inlet air treatment system 100, dust and debris carried by airflow 220 accumulates on pre-filter 216 such that the flow path through pre-filter 216 becomes restricted. Such restrictions result in an increased loss in air pressure across pre-filter 216. Differential pressure sensor 224 monitors the pressure drop across pre-filter 216. When a pressure drop across pre-filter 216 reaches a specified level, differential pressure sensor 224 transmits a signal to control system 18. In response, control system 18 operates hydraulic actuator 222 causing pre-filter 216 to move to bypass position 404. For example, in the exemplary embodiment, control system 18 moves pre-filter 216 to bypass position 404 when the differential pressure across pre-filter 216 is above about 1.5 inches of water column (WC). In bypass position 404, a user can access pre-filter 216 for cleaning of pre-filter 216 while turbine engine system 10 remains operational. After a user cleans pre-filter 216, control system 18 causes hydraulic actuator 222 to return pre-filter 216 to operating position 402.

In an alternative embodiment, snow and/or ice may form on pre-filter 216 when the ambient temperature and conditions are suitable. Temperature sensor 226 monitors the ambient temperature and transmits signals to control system 18 when the ambient temperature falls below a predetermined temperature at which snow and/or ice may form on pre-filter 216. The accumulation of snow and/or ice on pre-filter 216 further restricts airflow 220 through inlet hood 106 and may result in an increase in the differential pressure across pre-filter 216. Upon receiving a signal from temperature sensor 226, control system 18 operates hydraulic actuator 222 to move pre-filter 216 to bypass position 404. When the ambient temperature increases above a specified level, temperature sensor 226 transmits a signal to control system 18 indicating that the ambient temperature has increased to a temperature above which snow and/or ice may form on pre-filter 216. Upon receiving such a signal from temperature sensor 226, control system 18 operates hydraulic actuator 222 to return pre-filter 216 to operating position 402. Hydraulic actuator 222 moves pre-filter 216 at a rate of speed that ensures that any snow and/or ice formed on pre-filter 216 is prevented from releasing from pre-filter 216 and being undesirably channeled into air filter chamber 120. For example, in one embodiment, hydraulic actuator 222 moves pre-filter 216 to bypass position 404 when temperature sensor 226 senses a temperature at or below about 40° F.

Figure 4:
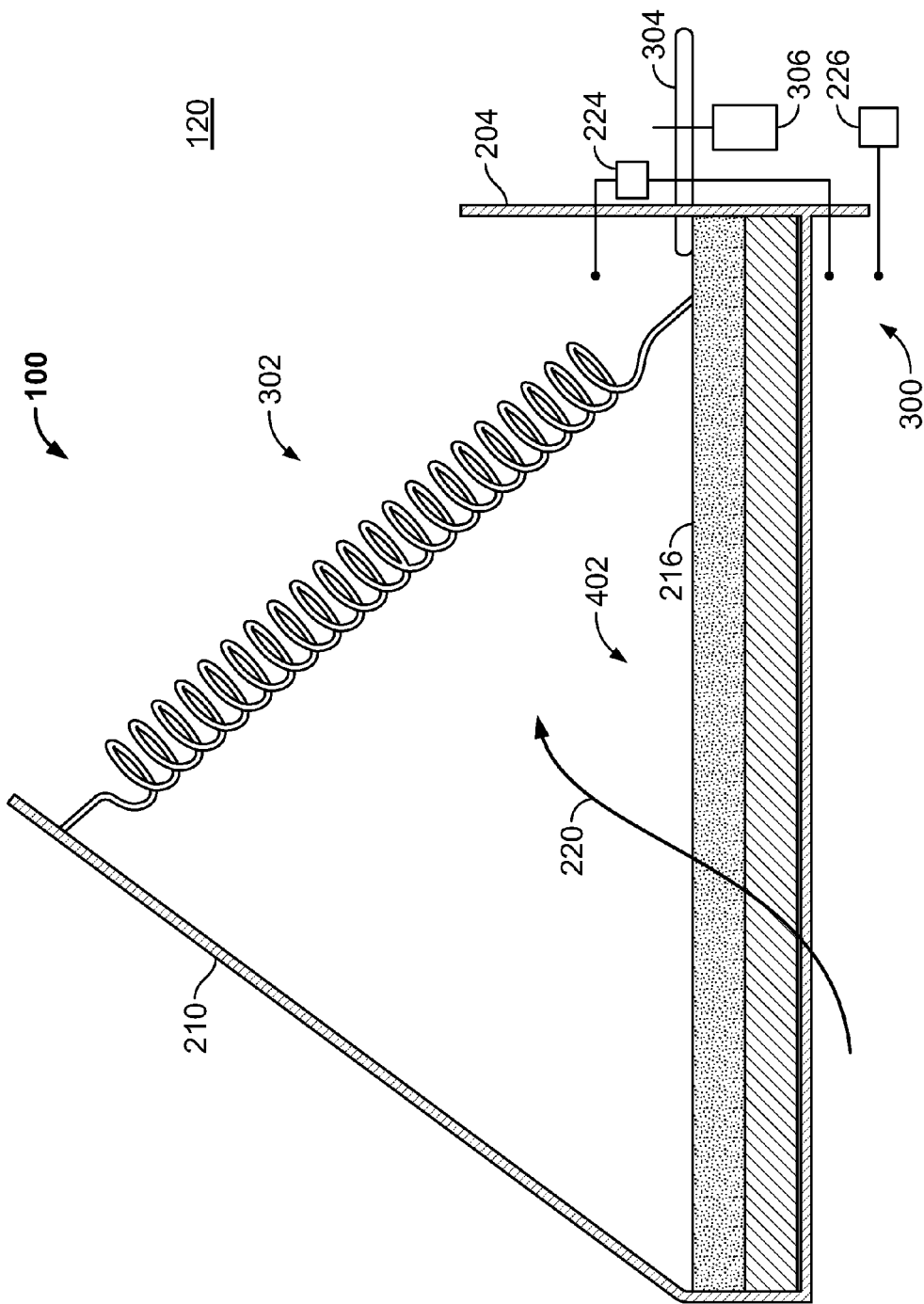
FIG. 4 is a schematic view of an alternative embodiment of a filter bypass assembly that may be used with the inlet air treatment system shown in FIG. 2.

FIG. 4 is a schematic view of an alternative filter bypass assembly 300 that may be used with the inlet air treatment system 100 (shown in FIG. 2). Components shown in FIG. 2 and FIG. 3 are labeled with the same reference numbers in FIG. 4. Filter bypass assembly 300 includes a biasing mechanism 302 coupled to pre-filter 216, a fastener assembly 304 coupled to enclosure outer wall 204, and a valve 306 coupled to fastener assembly 304. Biasing mechanism 302 extends between pre-filter 216 and upper hood member 210 for biasing pre-filter 216 from operating position 402 to bypass position 404 (shown in FIG. 3). In the exemplary embodiment, biasing mechanism 302 is a spring. Fastener assembly 304 is removably coupled to pre-filter 216 and is movable between an open position (not shown) and a closed position (shown in FIG. 4). In the closed position, fastener assembly 304 secures pre-filter 216 in operating position 402. In the open position, fastener assembly 304 does not secure pre-filter 216 in operating position 402, and biasing mechanism 302 biases pre-filter 216 to bypass position 404. Valve 306 is coupled to fastener assembly 304 to facilitate moving fastener assembly 304 between the open and closed positions. In the exemplary embodiment, fastener assembly 304 is a latch. Control system 18 is coupled in operational control communication with valve 306 for uncoupling fastener assembly 304 from pre-filter 216 after receiving a signal from differential pressure sensor 224 and or temperature sensor 226. During operation, when the differential pressure across pre-filter 216 increases above a specified limit, and/or the ambient temperature decreases to a predetermined temperature, control system 18 operates valve 306 to uncouple fastener assembly 304 from pre-filter 216. Biasing mechanism 302 biases pre-filter 216 from operating position 402 to bypass position 404 to enable airflow 220 to bypass at least a portion of pre-filter 216 into air filter chamber 120.

Figure 5:
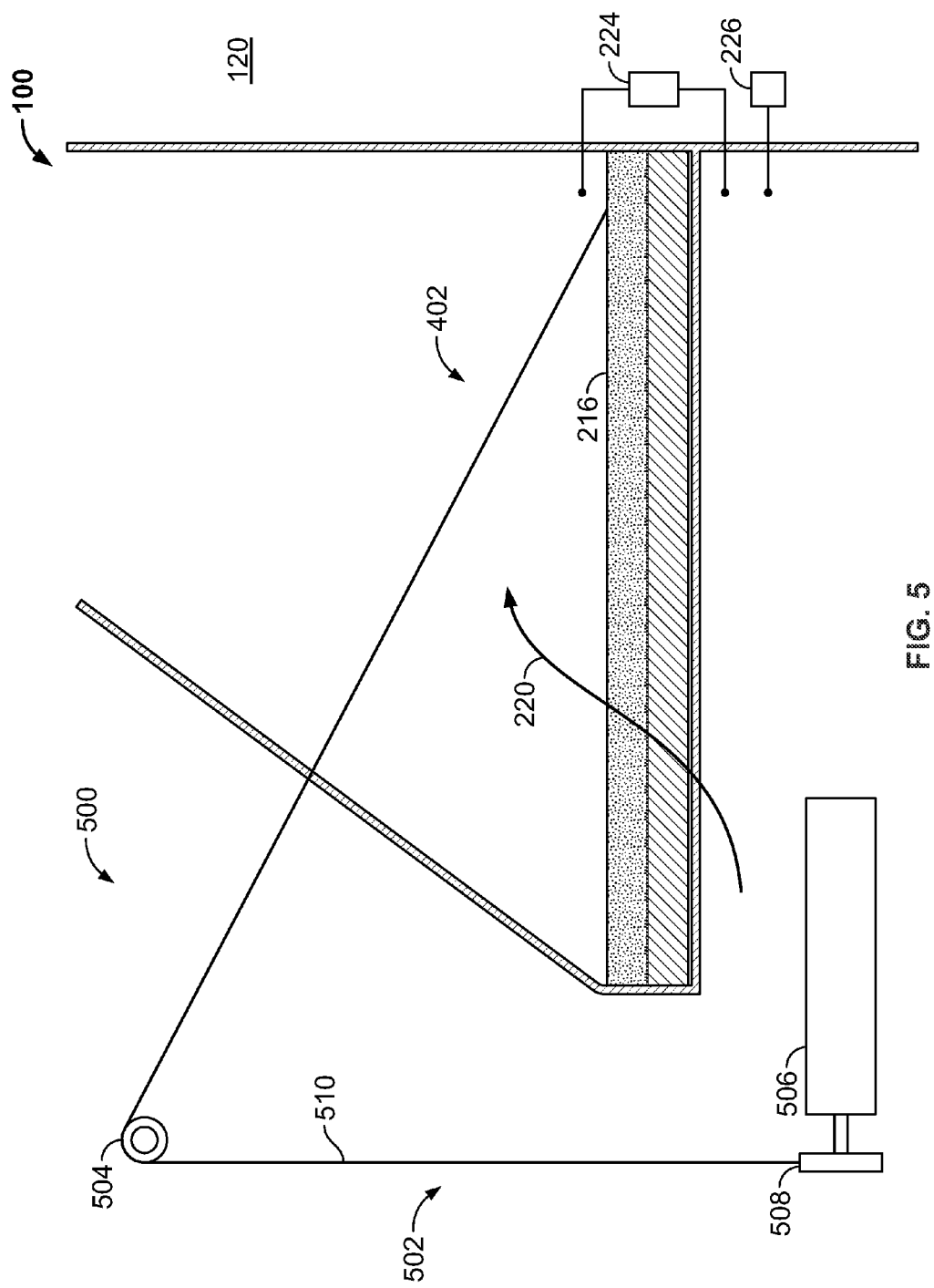
FIG. 5 is a schematic view of a further alternative embodiment of a filter bypass assembly that may be used with the inlet air treatment system shown in FIG. 2.

FIG. 5 is a schematic view of an alternative filter bypass assembly 500 that may be used with the inlet air treatment system 100 (shown in FIG. 2). Components shown in FIG. 2 and FIG. 3 are labeled with the same reference numbers in FIG. 5. Filter bypass assembly 500 includes a pulley assembly 502 coupled to pre-filter 216, for moving pre-filter 216 between operating position 402 and bypass position 404 (shown in FIG. 3). Pulley assembly 502 includes a plurality of pulleys 504, a motor 506 including a winding gear 508, and a pulley chain 510 extending between motor 506 and pre-filter 216. Motor 506 is coupled to pre-filter 216 via pulley chain 510. At least one pulley 504 is positioned between motor 506 and pre-filter 216 and is coupled to motor 506 and pre-filter 216 via pulley chain 510. Control system 18 is coupled in operational control communication with motor 506 for moving pre-filter 216 upon receiving a signal from differential pressure sensor 224 and/or temperature sensor 226. During operation, when the differential pressure across pre-filter 216 increases above a specified limit, and/or the ambient temperature decreases to a predetermined temperature, control system 18 operates motor 506 to rotate winding gear 508 for winding pulley chain 510 around winding gear 508 to reduce a length of pulley chain 510 extending between motor 506 and pre-filter 216. As pulley chain 510 is wound around winding gear 508, pulley chain 510 moves pre-filter 216 from operating position 402 to bypass position 404 to enable airflow 220 to bypass at least a portion of pre-filter 216 into air filter chamber 120. In bypass position 404, a user can access pre-filter 216 for manual cleaning of pre-filter 216. After the user cleans pre-filter 216, control system 18 operates motor 506 to unwind pulley chain 510 and to move pre-filter 216 to operating position 402. In a further alternative embodiment, control system 18 operates motor 506 to move pre-filter 216 to operating position 402 upon receiving a signal from temperature sensor 226 indicating a temperature below the formation of snow and/or ice on pre-filter 216. Filter bypass assembly 500 moves pre-filter 216 at a rate of speed such that the snow and/or ice formed on pre-filter 216 is facilitated to be prevented from releasing from pre-filter 216.

The above-described systems and methods facilitate removing an intake air pre-filter from operation without requiring a shutdown of the associated turbine engine. More specifically, the embodiments described herein enable an intake air pre-filter to be selectively bypassed without requiring a human operator to remove the pre-filter from service. In addition, the embodiments described herein facilitate selectively bypassing a pre-filter during operating periods when an increase in pressure drop across the pre-filter is high enough to reduce the operating efficiency of the turbine engine. As such, the cost of maintaining the gas turbine engine system is facilitated to be reduced.

Exemplary embodiments of systems and methods for bypassing an inlet air treatment filter are described above in detail. The systems and methods are not limited to the specific embodiments described herein, but rather, components of systems and/or steps of the method may be utilized independently and separately from other components and/or steps described herein. For example, the systems and method may also be used in combination with other air treatment systems and methods, and are not limited to practice with only the gas turbine engine system as described herein. Rather, the exemplary embodiment can be implemented and utilized in connection with many other combustion system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling an inlet air filter assembly for use with a turbine engine system, said method comprising:
    coupling an inlet hood having a base member that defines an inlet and an upper hood member that extends from the base member, to an air filter enclosure, such that an airflow path is defined between the inlet hood and the air filter enclosure;
    coupling a pre-filter to the base member, such that the pre-filter is positioned within the airflow path; and
    coupling a filter bypass assembly to the pre-filter for selectively moving the pre-filter between an operating position wherein an airflow passes through the at least a portion of the pre-filter, and a bypass position wherein the airflow enters the inlet hood without flowing through at least a portion of the pre-filter, during operation of the turbine engine system.

2. A method in accordance with claim 1 further comprising coupling an actuator to the pre-filter to selectively move the pre-filter between the operating and bypass positions.

3. A method in accordance with claim 1 further comprising coupling a pressure sensor to the pre-filter for sensing a pressure drop across the pre-filter.

4. A method in accordance with claim 1 further comprising coupling a temperature sensor to the pre-filter for sensing a temperature of ambient air entering the inlet air filter assembly.

5. An inlet air filter assembly for use in a gas turbine engine system, said inlet air filter assembly comprising:
an inlet hood coupled in flow communication with an air filter enclosure, said inlet hood comprising a base member that defines an inlet and an upper hood member that extends from the base member and a pre-filter coupled to the base member; and
a filter bypass assembly coupled to said pre-filter for selectively moving said pre-filter between an operating position wherein an airflow passes through at least a portion of the pre-filter and a bypass position wherein the airflow enters the inlet hood without flowing through at least a portion of the pre-filter, during operation of the gas turbine engine.

6. An inlet air filter assembly in accordance with claim 5, wherein said filter bypass assembly further comprises a hydraulic actuator coupled to said pre-filter for selectively moving said pre-filter between the operating and bypass positions.

7. An inlet air filter assembly in accordance with claim 5, wherein said filter bypass assembly comprises a pressure sensor coupled to said pre-filter for measuring a pressure drop across said pre-filter.

8. An inlet air filter assembly in accordance with claim 5, wherein said filter bypass assembly comprises a temperature sensor coupled to said pre-filter for measuring a temperature of ambient air entering said inlet air filter assembly.

9. An inlet air filter assembly in accordance with claim 5, wherein said pre-filter comprises at least one of a coalescing pad and a moisture separator.

10. An inlet air filter assembly in accordance with claim 5, wherein said filter bypass assembly further comprises a biasing mechanism extending between an inlet hood upper member and said pre-filter for biasing said pre-filter to the bypass position.

11. An inlet air filter assembly in accordance with claim 10, wherein said filter bypass assembly further comprises a fastener assembly coupled to said pre-filter for securing said pre-filter in the operating position.

12. An inlet air filter assembly in accordance with claim 11, wherein said filter bypass assembly further comprises a valve coupled to said fastener assembly for selectively moving said fastener assembly, said pre-filter selectively moves in response to movement of said fastener assembly.

13. An inlet air filter assembly in accordance with claim 5, wherein said filter bypass assembly further comprises a pulley assembly coupled to said pre-filter for selectively moving said pre-filter between the operating and bypass positions.

14. A gas turbine engine system comprising:
a compressor;
a combustor in flow communication with said compressor to receive at least some of the air discharged by said compressor; and
an inlet air filter assembly coupled in flow communication with said compressor; said inlet air filter assembly comprising a filter bypass assembly coupled to a pre-filter positioned within an inlet hood having a base member that defines an inlet and an upper hood member that extends from the base member, said filter bypass assembly configured to selectively move said pre-filter between an operating position, wherein an airflow passes through at least a portion of the pre-filter and a bypass position, wherein the airflow enters the inlet hood without flowing through at least a portion of the pre-filter, during operation of said gas turbine engine system.

15. A gas turbine engine system in accordance with claim 14, wherein said filter bypass assembly further comprises an actuator coupled to said pre-filter for selectively moving said pre-filter between the operating and bypass positions.

16. A gas turbine engine system in accordance with claim 14, wherein said filter bypass assembly comprises a pressure sensor coupled to said pre-filter for measuring a pressure drop across said pre-filter.

17. A gas turbine engine system in accordance with claim 14, wherein said filter bypass assembly comprises a temperature sensor coupled to said pre-filter for measuring a temperature of ambient air entering said inlet air filter assembly.

18. A gas turbine engine system in accordance with claim 14, wherein said pre-filter comprises at least one of a coalescing pad and a moisture separator.

19. A gas turbine engine system in accordance with claim 14, wherein said filter bypass assembly further comprises:
a biasing mechanism extending between an inlet hood upper member and said pre-filter for biasing said pre-filter to the bypass position;
a fastener assembly coupled to said pre-filter for securing said pre-filter in the operating position; and
a valve coupled to said fastener assembly for selectively moving said fastener assembly, said pre-filter selectively moves in response to movement of said fastener assembly.

20. A gas turbine engine system in accordance with claim 14, wherein said filter bypass assembly further comprises a pulley assembly coupled to said pre-filter for selectively moving said pre-filter between the operating and bypass positions.

* * * * *